US009090340B2

(12) United States Patent
Gölling

(10) Patent No.: US 9,090,340 B2
(45) Date of Patent: *Jul. 28, 2015

(54) HIGH LIFT SYSTEM FOR AN AIRCRAFT

(75) Inventor: Burkhard Gölling, Buchholz i.d.N (DE)

(73) Assignee: Airbus Operations GmbH, Hamburg (DE)

( * ) Notice: Subject to any disclaimer, the term of this patent is extended or adjusted under 35 U.S.C. 154(b) by 120 days.

This patent is subject to a terminal disclaimer.

(21) Appl. No.: 13/608,035

(22) Filed: Sep. 10, 2012

(65) Prior Publication Data

US 2013/0240676 A1  Sep. 19, 2013

Related U.S. Application Data

(63) Continuation of application No. PCT/EP2011/001130, filed on Mar. 8, 2011.

(60) Provisional application No. 61/311,504, filed on Mar. 8, 2010.

(30) Foreign Application Priority Data

Mar. 8, 2010 (DE) .......... 10 2010 010 577

(51) Int. Cl.
*B64C 21/04* (2006.01)
*B64C 9/18* (2006.01)
(Continued)

(52) U.S. Cl.
CPC . *B64C 21/04* (2013.01); *B64C 9/18* (2013.01); *B64C 21/06* (2013.01); *B64C 21/08* (2013.01);
(Continued)

(58) Field of Classification Search
CPC ............ B64C 21/04; B64C 9/16; B64C 9/38; Y02T 50/166; Y02T 50/44

USPC ......... 244/203, 201, 207, 208, 209, 211, 212, 244/215, 216, 130, 213, 53 B
See application file for complete search history.

(56) References Cited

U.S. PATENT DOCUMENTS 1,878,775 A * 9/1932 Henry ........................... 244/215
2,160,281 A * 5/1939 Price ........................... 244/53 R
(Continued)

FOREIGN PATENT DOCUMENTS

| BE | 358 128 | 2/1929 |
|---|---|---|
| CN | 101267980 | 9/2008 |

(Continued)

OTHER PUBLICATIONS

International Search Report for WO 2011/110327 dated Sep. 13, 2011.
(Continued)

*Primary Examiner* — Tien Dinh
*Assistant Examiner* — Assres H Woldemaryam
(74) *Attorney, Agent, or Firm* — Jenkins, Wilson, Taylor & Hunt, P.A.

(57) ABSTRACT

A high lift system with a main wing and control flaps, wherein the respective guiding device are at least partially provided with a fairing, having a flow control device for purposes of controlling the flow around the high lift system with at least two inlet ducts running along the main wing chordwise direction with in each case at least one inlet, which device is located on or underneath the lower surface of the high lift system, wherein at least one outlet duct for air is furthermore provided, which is connected with the inlet ducts in a fluid-communicating manner, and has at least one outlet, which is located on the upper surface of at least one regulating flap and/or with respect to the main wing chordwise direction in the rear third of the main wing of the high lift system.

22 Claims, 7 Drawing Sheets

(51) Int. Cl.
*B64C 21/08* (2006.01)
*B64C 21/06* (2006.01)

(52) U.S. Cl.
CPC ......... *B64C 2230/04* (2013.01); *B64C 2230/06* (2013.01); *Y02T 50/166* (2013.01); *Y02T 50/44* (2013.01)

(56) References Cited

U.S. PATENT DOCUMENTS

| | | | | |
|---|---|---|---|---|
| 2,169,416 A | * | 8/1939 | Griswold | 244/216 |
| 2,229,020 A | * | 1/1941 | Griswold | 244/212 |
| 2,334,975 A | * | 11/1943 | Williams | 244/216 |
| 2,346,326 A | * | 4/1944 | Peed, Jr. et al. | 244/216 |
| 2,366,751 A | * | 1/1945 | Read | 244/212 |
| 2,772,058 A | * | 11/1956 | Grant | 244/216 |
| 2,920,844 A | * | 1/1960 | Marshall et al. | 244/207 |
| 3,009,668 A | * | 11/1961 | Nystrom | 244/207 |
| 3,144,220 A | * | 8/1964 | Kittelson | 244/203 |
| 3,145,950 A | * | 8/1964 | Edvins | 244/216 |
| 3,332,644 A | * | 7/1967 | Whittley | 244/207 |
| 3,447,763 A | * | 6/1969 | Alastair | 244/207 |
| 3,576,301 A | * | 4/1971 | Stickle | 244/216 |
| 3,583,660 A | * | 6/1971 | Hurkamp et al. | 244/207 |
| 3,677,504 A | * | 7/1972 | Schwarzler | 244/212 |
| 3,767,140 A | * | 10/1973 | Johnson | 244/216 |
| 3,920,203 A | * | 11/1975 | Moorehead | 244/207 |
| 3,921,942 A | * | 11/1975 | Bracka | 244/87 |
| 4,015,787 A | * | 4/1977 | Maieli et al. | 244/215 |
| 4,120,470 A | * | 10/1978 | Whitener | 244/213 |
| 4,131,252 A | * | 12/1978 | Dean et al. | 244/212 |
| 4,398,688 A | | 8/1983 | Williams | |
| 4,705,236 A | * | 11/1987 | Rudolph | 244/90 R |
| 4,720,066 A | * | 1/1988 | Renken et al. | 244/213 |
| 5,366,177 A | | 11/1994 | Decoux | |
| 5,447,763 A | | 9/1995 | Gehlke | |
| 5,772,165 A | | 6/1998 | Schroeder et al. | |
| 6,253,126 B1 | * | 6/2001 | Palmer | 701/14 |
| 7,243,881 B2 | * | 7/2007 | Sakurai et al. | 244/212 |
| 7,255,309 B2 | * | 8/2007 | Boldrin et al. | 244/208 |
| 8,336,829 B2 | | 12/2012 | Reckzeh et al. | |
| 8,690,107 B2 | * | 4/2014 | Golling | 244/208 |
| 2003/0150962 A1 | | 8/2003 | Orban | |
| 2006/0196633 A1 | | 9/2006 | Mahjoub | |
| 2006/0261217 A1 | | 11/2006 | Voogt | |
| 2007/0034746 A1 | | 2/2007 | Shmilovich | |
| 2007/0095982 A1 | | 5/2007 | Kismarton et al. | |
| 2012/0001028 A1 | * | 1/2012 | Frey et al. | 244/208 |
| 2013/0009015 A1 | | 1/2013 | Golling | |
| 2013/0026300 A1 | | 1/2013 | Goelling et al. | |
| 2013/0240676 A1 | | 9/2013 | Goelling | |

FOREIGN PATENT DOCUMENTS

| | | |
|---|---|---|
| DE | 10 2009 011 662 A1 | 9/2010 |
| DE | 10 2009 060 325 | 6/2011 |
| DE | 10 2009 060 326 | 6/2011 |
| DE | 10 2010 010 577 | 9/2011 |
| EP | 0 068 737 | 6/1982 |
| WO | WO 2010/084025 | 7/2010 |
| WO | WO 2011/076428 | 6/2011 |
| WO | WO 2011/110327 | 9/2011 |

OTHER PUBLICATIONS

German Office Action for Application No. 10 2010 010 577.5 dated Sep. 10, 2013.
International Search Report for Application Serial No. PCT/EP2010/007924 dated Aug. 12, 2011.
German Office Action for Application No. 10 2009 060 325.5 dated Sep. 18, 2013.
Chinese Office Action for Application No. 201080064862.0 dated Jun. 23, 2014.
Non-Final Office Action for U.S. Appl. No. 13/530,151 dated Jun. 6, 2014.
Interview Summary for U.S. Appl. No. 13/530,151 dated Dec. 16, 2014.
Notice of Allowance for U.S. Appl. No. 13/530,151 dated Jan. 28, 2015.
Interview Summary for U.S. Appl. No. 13/530,151 dated Jan. 22, 2015.

* cited by examiner

HIGH LIFT SYSTEM FOR AN AIRCRAFT

CROSS-REFERENCE TO RELATED APPLICATIONS

This application is a continuation of and claims priority to PCT/EP2011/001130 filed Mar. 8, 2011 which claims the benefit of the filing date of German Patent Application No. DE 10 2010 010 577.5 filed Mar. 8, 2010 and of U.S. Provisional Patent Application No. 61/311,504 filed Mar. 8, 2010, the disclosures of which applications are hereby incorporated herein by reference.

TECHNICAL FIELD

The invention concerns a high lift system for an aircraft.

BACKGROUND

Documents U.S. Pat. Nos. 5,772,165 B1 and 5,366,177 A describe a wing, which comprises on the upper surface openings for discharging air in order to control the air flow around the wing.

The object of the present invention is to solve the problems of the systems of known art as described above.

The above object is achieved by a high lift system with the features of claim 1 and also by an aircraft with the features of claim 16. Advantageous embodiments ensue from the dependent subsidiary claims.

SUMMARY

A high lift system in accordance with the invention has a main wing and control flaps, also support devices for the mounting of the control flaps, and positioning devices or guiding devices for the mounting and/or positioning of the control flaps, wherein the respective guiding device is provided at least partially with a covering. The guiding device is designed for guiding the movement of the control flap. The control flap can be a leading edge high lift flap or another control flap like a spoiler or an aileron.

According to an embodiment of the invention, a high lift system is provided, the high lift system comprising: a main wing and control flaps, also support devices for the mounting of the control flaps, and guiding devices for the positioning of the control flaps, wherein the respective support devices and/or guiding devices (130) are at least partially provided with a fairing. The high lift system further comprises:

a flow control device (10) for purposes of influencing the flow around the main wing (200) and control flaps (300, 400), with at least one inlet duct (20) running along the main wing chordwise direction (H-KT) each with at least one inlet (22), which is located on or underneath the lower surface (204) of the main wing (200), and at least one outlet duct (30), which is connected with the at least one inlet duct (20) in a fluid-communicating manner, and has at least one outlet (32) so that fluid which is streaming into the inlet duct (20) can be discharged through the outlet (32), wherein the outlet (32) is located on the upper surface (313, 413) of the at least one control flap (300, 400) and/or on the upper side of the main wing (200), on the main wing (200) in the rear third of the length of the main wing with respect to the main wing chordwise direction (H-KT), wherein the flow control device (10) is arranged at least partially within the fairing (118), and the inlet (22) of the at least one inlet duct (20) is facing in opposition to the main wing chordwise direction (H-KT) of the main wing (200), and wherein at least one inlet (22) per inlet duct (20) is arranged in a range starting from the front of the fairing (118) with respect to the main wing chordwise direction (H-KT) and extending to over one third in the direction of the main wing chordwise direction.

According to an embodiment of the invention, the fairing (118) comprises at least two inlet ducts (20), each comprising at least one inlet (22), wherein two inlets of the inlets are respectively disposed on flow surfaces extending in directions diverging from each other.

According to an embodiment of the invention, at least one outlet duct (30) is provided per inlet duct (20) in each case, which is connected with the respective inlet duct (20) in a fluid-communicating manner, and the outlet ducts (30) run along the main wing chordwise direction (H-KT).

According to an embodiment of the invention, the inlets (22) in each case are designed as openings directly in the fairing (118).

According to an embodiment of the invention, inlet shut-off devices (24) are provided for the inlets (22), and/or an outlet shut-off device (34) is provided for at least one outlet (32). An activation device (600) may be provided for the receipt of flight state data and the generation of control signals, of which the flow control device (10) can be activated and deactivated under particular flight conditions. The activation device (600) may be functionally coupled to the at least one shut-off device and/or at least one flow variator (50) for controlling the respective one in dependency of the position of the control flap (300, 400) on which the respective shut-off device is positioned.

According to an embodiment of the invention,
at least one control flap (300, 400) comprises at least one outlet (32) which is located on the upper surface (313, 413) of the respective control flap (300, 400), wherein at the at least one outlet (32) an inlet shut-off device (24) is disposed, and
the at least one outlet shut-off device (34) is coupled kinematically and/or functionally with the position of the control flap (300, 400), such that the status of the respective shut-off device (24, 34) is determined by the setting of the control flap (300, 400).

According to an embodiment of the invention,
at least one control flap (300, 400) comprises at least one outlet (32) which is located on the upper surface (313, 413) of the respective control flap (300, 400), wherein at the at least one outlet (32) an inlet shut-off device (24) is disposed, and
at least one inlet shut-off device (24) is coupled kinematically and/or functionally with the position of the control flap (300, 400), such that the status of the respective shut-off device (24, 34) is determined by the setting of the control flap (300, 400).

Furthermore a flow control device is provided for purposes of controlling the flow around the high lift system; this has at least two inlet ducts running along the main wing chordwise direction, in each case with at least one inlet, which is located on or underneath the lower surface of the high lift system; furthermore it has at least one outlet duct for air, which is connected with the inlet ducts in a fluid-communicating manner, and has at least one outlet. This outlet is located on the upper surface of at least one regulating flap and/or, with respect to the main wing chordwise direction, in the rear third of the main wing of the high lift system. In this manner control of the flow is not only possible on the respective regulating flap, but also earlier in the region positioned upstream of this regulating flap, as seen in the flight direction. In this manner in the event of a delay in effectiveness of the flow control, with regard to the flow direction this control can also be executed on the regulating flap, so as to settle any flow separation. Furthermore in a high lift system in accordance with the invention the flow control device is arranged at least partially within the covering. The inlets of the flow control device are thereby facing towards the main wing chordwise direction of the high lift system. Here at least one inlet per inlet duct is arranged, with respect to the main wing chordwise direction, in the front third, and in each case on one side of the covering. In this manner two important advantages can be achieved. On the one hand by the arrangement of the flow control device within the covering, which is usually designated as a "fairing", any undesirable influence it has on the flow on the lower surface of the high lift system can be reduced or avoided altogether. Thus in addition to serving the aerodynamics of the flow around the lower surface of the high lift system, the aerodynamically optimised outer contour of the fairing also accommodates at least part of the flow control device. To achieve the volumetric flow of air necessary for controlling the flow, air from outside the high lift system is introduced into this flow control device via the inlet of the flow control device. The particular arrangement of the inlets in the front third of the fairing is thereby of advantage with respect to the volumetric flows of air achievable in the flow control device. The provision of inlets on both sides of the fairing, for example in an essentially symmetrical arrangement with respect to the main wing chordwise direction, has moreover the advantage that within the flow control device a symmetrical distribution of the volumetric flow of air can be achieved, even at the higher volumetric flows of air. The flow control device of a high lift system according to the invention can in this manner be regulated in a simpler and more accurate manner so as to control the flow on the upper surface of the high lift system.

A second great advantage of such a system is that it can be configured to operate in a passive manner. This is achieved by turning the inlets towards the main wing chordwise direction of the high lift system. Here the term "facing towards" the main wing chordwise direction is to be understood to mean that at least part of the inlet opening's cross-section opens in the direction of the main wing chordwise direction. Designs that have inlet opening cross-sections that are parallel to the main wing chordwise direction are thus excluded. In this manner the air flowing on the lower surface of the high lift system can in accordance with the invention penetrate unhindered into at least the facing part of the inlet cross-section, and can gain access to the inlet duct of the flow control device. The impingement of high pressure air onto the flow control device thus takes place automatically or, so to speak, passively by means of the movement of the whole high lift system, together with an aircraft, for example. The effect on the flow on the lower surface of the high lift system caused by the arrangement of the inlets according to the invention is also thereby reduced to a minimum, since only the necessary quantity of air is extracted through the minimal opening of the inlet from this lower surface flow, while the remaining flow runs in an aerodynamically optimised manner along the fairing underneath the high lift system. By means of the embodiment in accordance with the invention a passive system is thus constituted that is easy to configure in design terms and at the same time is fitted onto the lower surface flow of the high lift system with few aerodynamic disadvantages.

For some applications it can be advantageous if the inlet ducts and also the inlets are arranged symmetrically relative to one another with respect to the main wing chordwise direction. Here the term "symmetrical arrangement" is understood to include also those cases that deviate only a little, in particular less than 30%, from the purely geometrical definition of symmetry, with respect to distances of positions from the axis of symmetry.

Furthermore it can be advantageous if the inlets are designed such that they do not generate any important significant flow losses in settings of the control flaps that are assigned to an aircraft's takeoff and landing procedures. An arrangement of this kind combines the advantage of the passive provision of volumetric flows of air for the flow control device with a reduction of the air resistance on the lower surface of the high lift system.

It is furthermore possible that at least one outlet duct is provided per inlet duct in each case, which is connected with the respective inlet duct in a fluid-communicating manner, wherein the outlet ducts run along the main wing chordwise direction. An arrangement of this kind for the outlet ducts contributes to the overall symmetry of the flow control device. In particular the flow cross-sections and duct lengths of the individual corresponding inlet ducts and outlet ducts are here essentially identical. Thus a symmetrical volumetric flow distribution of air is achieved within the flow control device, which simplifies and/or partially first enables, a defined flow control on the upper surface of the high lift system.

It can be advantageous if in a high lift system in accordance with the invention at least the inlets are in each case designed as openings in the fairing. The further fusion of inlet duct, inlet and fairing is very advantageous from the aerodynamic points of view. The constitution of the inlets directly in the fairing thus enables a seamless transition between the flow control device within the fairing and the fairing itself. This means that no element of the flow control device projects out of the fairing, but rather that the inlet ducts end flush on the fairing with their inlets. Here each inlet can have a wide variety of geometrical shapes. In addition to simple round or elliptical cross-sections, which can be of practical benefit where there are different angles of inclination to the main wing chordwise direction in achieving the effective flow cross-sectional area required for the quantity of air to control the flow, complex geometries or even intersecting surfaces can also be advantageous; these arise automatically, so to speak, as a result of a flush ending with the fairing of the high lift system. Here in the provision of the inlets a symmetrical arrangement of the inlets is advantageously provided, and thus an advantageously even number of inlets for the flow control device, such as for example two, four or six.

With a high lift system in accordance with the invention an inlet shut-off device can be provided for the inlets. Such inlet shut-off devices can be configured in a wide variety of ways. Thus it is, for example, possible that this inlet shut-off device functions in a purely mechanical or piezoelectric manner. Elastic materials or electrically-activated elastic materials can also be used for the configuration of the inlet shut-off device. The deployment of so-called smart elastic materials, which for example open like an excess pressure valve when a particular back pressure is exceeded, can also be of practical benefit. Here it is to be noted that both an active activation of the inlet shut-off device, and also a passive, so to speak, an automatic configuration of these inlet shut-off devices can be of practical benefit for the functionality of the present invention. In particular the passive configuration of the inlet shut-off device can be of great advantage with its minimum possible complexity where there is a need for weight reduction. Where there is a need for active control under a wide variety of flight conditions, however, it can also be of advantage if the inlet shut-off device can operate actively, for example in the form of mechanically controllable flaps. For both active and passive systems, or also combinations of the two variants, further sensors are advantageous; these control and monitor the current flow conditions of the high lift system, in particular in the regions that are to be controlled by the flow control device. These sensors can, on the one hand, be processed directly via the central control logic of the high lift system or an aircraft fitted with such control logic; however, they can also be used in a decentralised manner, that is to say in the flow lift system itself, for purposes of controlling the inlet shut-off devices.

Furthermore in a high lift system in accordance with the invention an outlet shut-off device for at least one outlet can also be provided. The outlet shut-off device can, as already explained in detail for the inlet shut-off device, also be structurally embodied in an identical manner. An additional option for the outlet device is an automatic opening when a certain internal pressure has been exceeded. A pressure relief valve can, so to speak, be used in this manner to control the outlet of air from the outlet of the flow control device via the flow control device in a passive manner.

In a high lift system in accordance with the invention it can be advantageous if the inlet shut-off devices and/or the outlet shut-off devices are coupled with the guiding device for a positioning flap of the high lift system such that the status of the respective shut-off device is determined by the setting of the regulating flap. This correlation can operate both actively, and also passively. In the case of active correlation, sensors of an electrical or also a mechanical type can be present to detect the current location of the regulating flap. The detection of the location of the regulating flap by means of the actuator of the guiding device itself is also conceivable. As a function of the location of the regulating flap the inlet shut-off devices and/or the outlet shut-off devices are subsequently actively opened or closed, such that, for example, in low speed flight during the takeoff or landing procedure with an extended regulating flap, both the inlet shut-off devices and the outlet shut-off devices open and the flow is controlled. Passive actuation is also conceivable. Thus a kinematic coupling, for example, can be provided by means of a transmission system between the guiding device for the positioning of the control flaps and the inlet shut-off devices and/or the outlet shut-off devices. Such a transmission system, which is driven directly with the positioning of the regulating flap, can, for example via further sequential mechanical systems, open and/or close the inlet shut-off devices and/or the outlet shut-off devices.

Here it can be advantageous if in a high lift system in accordance with the invention the degree of opening of the respective shut-off device is a function of the setting of the regulating flap of the high lift system. This signifies that the respective shut-off device can open and close in a quantitative manner. Thus different flows of air through the flow control device can be adjusted via the degree of opening of the inlet shut-off device and the outlet shut-off device. Depending on the level of necessity for flow control, which in turn can be dependent on the setting of the control flaps, the level of control can thus be adjusted via the degree of opening of the inlet shut-off device and the outlet shut-off device. But the basic, that is to say, non-quantitative, opening of the shut-off devices can be a function of the setting of the regulating flap. Thus under flight conditions in which the regulating flap is in a neutral position, in cruise, for example, the inlets can be closed to achieve fuel-saving aerodynamics over the fairing, while opening of the shut-off devices only takes place under flight conditions in which the regulating flap is activated, that is to say, extended for example.

With a high lift system in accordance with the invention at least the inlet ducts and/or each outlet duct can furthermore be provided with at least one control valve or at least one pump to control the volumetric flow within the flow control device, wherein the control valve or the pump are arranged opposite one another with respect to the main wing chordwise direction. This arrangement is preferably configured such that the control valves and/or the pumps are again positioned symmetrically in the respective duct. Such a symmetrical arrangement leads again to a symmetrical distribution of the volumetric flow of air within the flow control device. In particular when using the flow control device under particular flight conditions a pump or control valve can optimise the flow control device even further. For example, a pump can be used to suck in additional air under particularly low-speed flight conditions, for example during the landing procedure, if the quantity of air necessary to control the flow cannot be satisfactorily guaranteed via the inlet of the flow control device under the low-speed flight condition. Thus even under low-speed flight conditions a high pressure and thus a high volumetric flow rate through the flow control device is possible. However, such a pump serves only to assist the control of the flow and can therefore be embodied in a relatively compact and low power design. The main load on the flow control device, in other words the majority of the air, continues to be generated in a passive manner by the flow velocity on the lower surface of the high lift system. As an alternative to, or in parallel with, the use of a pump, a control valve can also be used, under flight conditions in which full opening of the inlet shut-off device and outlet shut-off device would produce too large a flow of air, which would have too great an effect on the flow. Such a control valve can then reduce a range of diameters of the flow control device, such that the maximum volumetric flow of air is similarly reduced. With the use of a pump and/or control valve the provision of shut-off devices for the inlet and outlet ducts can, for example, be dispensed with, insofar as the former two elements can be brought into fully shut-off settings.

A high lift system in accordance with the invention can furthermore be fitted in each inlet duct with at least one flow variator for the systematic variation of the flow of air through the flow control device, wherein the flow variators are arranged opposite one another with respect to the main wing chordwise direction. The flow variators too are once again preferably arranged essentially symmetrically to one another with respect to the main wing chordwise direction. Such a flow variator can be directed in particular towards the variation of the flow with time. At a defined flight condition a volumetric air flow variation at a frequency can, for example, be generated by means of the flow variator. In particular a pulsed expulsion of the quantity of air present in the flow control device is thus possible. The pulsed expulsion on the upper surface of the high lift system has thereby a particularly positive effect on the flow there, in particular on a reduction or prevention of the separation of the flow in these regions, or even a reattachment of the flow in this region. The flow variator can be fitted at different positions within the flow control device. Thus a fitting directly at inlet or outlet is just as possible as the arrangement of the flow variator within the inlet duct or outlet duct. The use of a flow variator for a multiplicity of inlet and outlet ducts as a common flow variator is also conceivable.

The outlet duct can also have a Y-bifurcation, where the flow variator sits in one arm of the bifurcation, and flow can pass freely through the second arm of the bifurcation. With such an embodiment a defined basic flow of air can thus be set to flow via the free flow arm, while a variable quantity of air is superposed on this basic quantity of air via the second arm and the flow variator. In such a case, in other words, the quantity of air at the outlet of the flow control device does not fluctuate between zero and a defined value, but rather between a minimum (free arm) and a maximum value (pulsed arm).

A flow variator in accordance with the invention can, for example, be embodied as a passively operating valve, or an actively operating pump. A passively operating valve can, so to speak, be embodied as a mechanical oscillating circuit, which enables a defined opening and closing of the valve matched to one frequency. Thus different shut-off frequencies of the flow variator, and thus different pulse frequencies of the flow control device, can be achieved at different air speeds. An active embodiment in the form of a pump, which runs at a frequency-controlled rotational speed, in particular at different rotational speeds, can also be deployed here. Here in a high lift system in accordance with the invention the flow variator can, for example, be arranged in the region of the at least one outlet or outlet duct. The proximity of the flow variator to the outlet has the advantage that the speed with which alterations to the pulse frequency of the flow variator reach the actual flow on the upper surface of the high lift system, and thus influence the latter, is very high, and thus a very short control response time ensues. Further advantages are the low pressure losses, and also the short flow paths that thereby occur. Thus the flow on the upper surface of the high lift system can be controlled, and above all, optimised effectively, very quickly and very accurately by means of the flow control device.

In a high lift system in accordance with the invention an activation device can furthermore be provided for the receipt of flight state data and the generation of control signals, by means of which the flow control device can be activated and deactivated under particular flight conditions, Here the terms "activation" and "deactivation" of the flow control device are to be understood to be applied to the fluid mechanical effectiveness of the flow control device. Here, for example, activation can take place by the opening of an inlet shut-off device and/or an outlet shut-off device of the flow control device. Although the flight state data are here related in particular to the flight speed, they are also related to state data of the high lift system itself. Such flight state data of the high lift system can for example be collected by load sensors or flow sensors on the high lift system, in particular on the control flaps themselves, or in the region around the control flaps.

In order to achieve as efficient a design as possible, it can be advantageous in a high lift system in accordance with the invention if a distribution duct is provided between the inlet ducts and the at least one outlet duct. In particular this distribution duct is of practical benefit if a multiplicity of outlet ducts are to be served by a few inlet ducts. Thus a relatively large inlet duct with correspondingly large inlets can be concentrated into the fairings present under the high lift system, while via the distribution duct a multiplicity of outlet ducts and thus a multiplicity of outlets can be served on the upper surface of the high lift system. In particular a multiplicity of outlets are thereby distributed over the whole of the surface of the high lift system to be controlled. Here distribution can take place both in the chordwise direction, and also in the spanwise direction of the main wing, or the respective regulating flap. The distribution duct can in addition be intended as a site for the accommodation of central flow variators, and/or pumps, and/or control valves. In this manner further cost and weight can be saved by means of a central element for purposes of flow control within the flow control device.

For situations in which the volumetric flow of air within the flow control device exceeds the requirement for flow control, it can be of practical benefit in a high lift system in accordance with the invention to bring the inlet ducts into fluid-communicating contact with further systems, generally designated 700, of the aircraft 1. For example, a fluid-communicating contact with the air conditioning system and the hydraulic or pneumatic systems is advantageous. In this manner pumps or additional inlets that would otherwise be required for these systems can be dispensed with, or such pumps can be designed to be more compact and of lower power, and thus more cost-effective and weight-saving.

With a connection in a fluid-communicating manner with the air conditioning system an efficient adaptation of the cabin pressure is possible, in particular in the event of rapid changes in flight altitude. Through the passive provision of large volumetric flows of compressed air and the connection in a fluid-communicating manner of the flow control device with the pressure cabin regulating system a large quantity of air can be made available for raising the pressure in the pressure cabin relatively quickly and without additional compressors or power takeoff from the engine. This also applies to the same extent in the reverse direction, namely the relatively rapid removal of air by suction, i.e. with the relatively rapid release of pressure, from the pressure cabin via the multiplicity of outlets of the outlet ducts of the flow control device. Connection in a fluid-communicating manner is thus to be understood to be present in both directions, namely for purposes of raising the pressure in the cabin from the inlets and for reducing the pressure from the cabin to the outlets.

In particular in the use of a high lift system in accordance with the invention with a flow control device that is designed to control the adjustable control flaps, it can be advantageous if the ducts, in particular the inlet ducts, the outlet duct, or the distribution duct are at least partially alterable in their axial projection. For example, when the control flaps, in particular the trailing edge flap, are displaced from the main wing, connection in a fluid-communicating manner within the inlet duct can thus be maintained, despite an axial displacement. One possible form of embodiment for the axial variability is a design in the form of a telescopic duct, which is fitted with telescopic elements that can slide within one another. Embodiment as a bellows hose for bridging the axial variations in length is also conceivable within the framework of the present invention.

In a high lift system in accordance with the invention it can also be of practical benefit if the outlets are arranged along the main wing spanwise direction. Such a distribution of the outlets has the advantage that control of the flow can take place over a wide region in the main wing spanwise direction. In this manner any separation of the flow can preferably be prevented or at least delayed on the whole regulating flap in the spanwise direction. Arrangement along a straight line has the advantage that once again an essentially symmetrical flow control can be executed with respect to the main wing chordwise direction.

Furthermore it can be advantageous if the outlets are arranged along at least two lines in the main wing spanwise direction, wherein the outlets of one line are arranged in the main wing spanwise direction displaced relative to each of the outlets of the adjacent line. Here the straight lines are displaced relative to one another in the main wing chordwise direction. In this manner a near-continuous control of the flow across the upper surface of the regulating flap can be achieved in fluid mechanics terms, without having to accommodate unnecessarily large outlets.

The presence of load sensors and/or flow sensors, behind the outlets in the main wing chordwise direction, of a high lift system in accordance with the invention can also be advantageous. This arrangement allows a feedback of information concerning the effectiveness of the flow control. In this manner a control circuit can be installed, which regulates the flow control device as a function of the actual flow conditions. The flow variator, or control valves or pumps provided, can for example be adapted with respect to their control parameters as required. Control of the flow with respect to the avoidance or delay of any flow separation can in this manner take place even more effectively.

Here the load sensors and the flow sensors can be arranged alternately in the main wing spanwise direction. This enables essentially constant monitoring of both load conditions and flow conditions with respect to any potential flow separation, and thus an even more effective control of the flow.

An embodiment of the high lift system according to the invention an additional flow control device can be implemented as a gap between a regulating flap in particular a leading-edge flap of the high lift system and the main wing. Under certain flight conditions a defined quantity of air can pass through this gap from the lower surface of the high lift system onto the upper surface of the high lift system, in particular of the regulating flap. Under particular flight conditions, for example in low-speed flight during landing or takeoff, separation of the flow on the regulating flap under such flight conditions can be avoided or reduced. What is problematical in the high lift systems of known art is that the supply of air via the gap onto the upper surface of the high lift system takes place relatively inexactly, and in particular in an uncontrolled manner. It is dependent on the current flight condition and, for example, on gusts. Moreover the gap geometry ensues as a function of the aerodynamic geometry of the whole high lift system that is necessary under various flight conditions. For example, the gap ensues as a result of the extension of a trailing edge flap as a so-called landing flap. In the retracted state, accordingly, no gap is present, and as a result it is not possible to supply the flow above the high lift system with a flow of air from the lower surface of the high lift system.

An aircraft with at least one high lift system in accordance with the invention is likewise a subject of the present invention. Such an aircraft, by virtue of the use of a high lift system in accordance with the invention, can on the one hand be constructed with a reduced weight, and moreover can also have improved aerodynamics under difficult flight conditions such as takeoff and landing. In addition to saving fuel these improved aerodynamics can also lead to further optimisations, such as lower stable flight speeds and thus shorter landing and takeoff procedures. Such optimisation is aimed primarily at the reduction of noise emissions.

BRIEF DESCRIPTION OF THE DRAWINGS

The present invention is described in more detail with the aid of the examples of embodiment and the following figures. In the figures.

DETAILED DESCRIPTION

In order to elucidate the respective directions for the following description of the forms of embodiment as a function of the high lift system, the individual directions are defined as follows:

For the control flaps 300, 400 a flap chordwise direction or general chordwise direction is defined as K-KT, a flap spanwise direction or general spanwise direction as K-SW, and a flap thickness direction or general thickness direction as K-KD. For the main wing a main wing chordwise direction H-KT or a general chordwise direction, a main wing spanwise direction H-SW or a general spanwise direction, and a main wing thickness direction H-KD or a general thickness direction are accordingly defined. The respective directions are again to be found in FIGS. 1, 2, 3 and 4.

Figure 1:
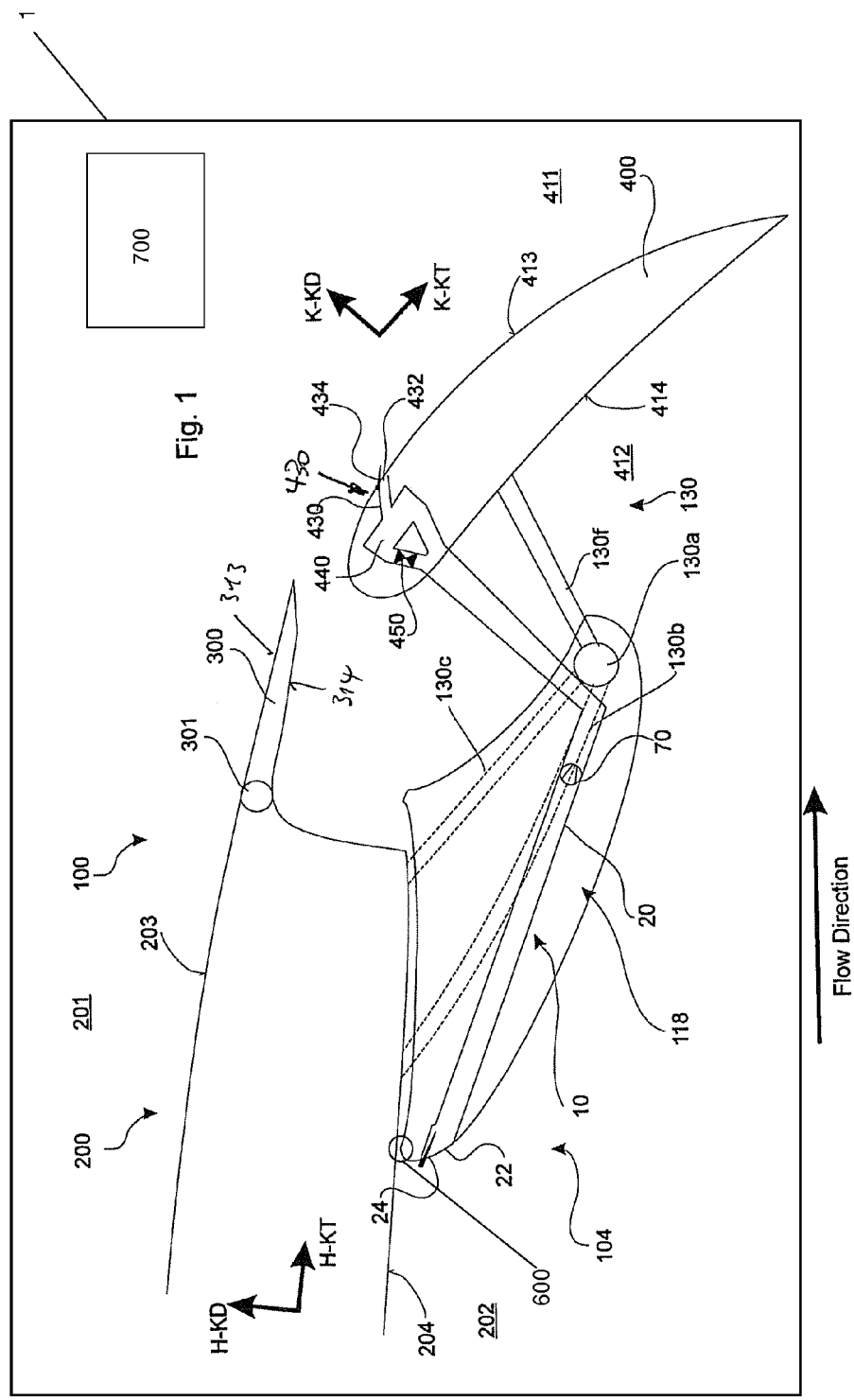
FIG. 1 shows a first example of embodiment of the present invention.

FIG. 1 shows a first example of embodiment of a high lift system 100. Here the high lift system 100 has a main wing 200, a spoiler 200, and also a trailing edge flap 400. As the spoiler 200 can also be used for steering an aircraft, an embodiment of the invention relates to an aircraft, generally designated 1, comprising a flight control system comprising control flaps for steering the aircraft 1, a steering unit functionally connected to the control flaps and flight state sensor unit for commanding the control flaps in dependency of the data of the flight state sensor unit and a high-lift system comprising at least one control flap and in particular at least one leading-edge flap. The trailing edge flap 400 and the spoiler 200 are both control flaps 300, 400. In FIG. 1, a trailing edge flap 400 coupled to the main wing 200 is shown in the extended state. This extended state is, for example, a deployed state in which the high-lift flap forms a take-off configuration with the main wing or landing configuration with the main wing so as to increase the lifting surface of the high lift system and also the profile curvature of the high lift system 100.

The trailing edge flap 400 is coupled to the main wing 200 by means of at least one guiding device 130 by which the trailing edge flap 400 is supported and by which the movement of the trailing edge flap 400 is guided. Optionally a drive device can be coupled between the main wing 200 and the trailing edge flap 400 for actuating the movement of the trailing edge flap 400 with regard to the main wing 200. In this regard, the guiding device 130 has the function of a support device. The guiding device can be realized as dropped hinge kinematics of as track kinematics. In the figures an embodiment of the guiding device is shown which comprises a dropped hinge kinematics which comprises carriers 130b, 130c or bars fixed to a support of the main wing. The carriers 130b, 130c and at least one bar 130d, 130e, 130f being fixed to the control flap 400 are connected to each other by a hinge 130a so that the flap 400 can be moved with regard to the main wing 200.

Further, the guiding device 130 is provided with a fairing 118 for aerodynamically covering the guiding device 130. Amongst other purposes this fairing serves to achieve a defined flow around the guiding device 130 in the area of the lower surface 204 facing the pressure side 202 of the main wing 200. In opposition to the lower surface 204, an upper surface 203 facing the suction side 201 of the main wing 200 is provided.

The leading edge flap 400 comprises a lower surface 404 facing the pressure side 402 of the leading edge flap 400 or the main wing 200 and an upper surface 203 facing the suction side 201 of the leading edge flap 400 or the main wing 200 and being oriented in opposition to the lower surface 204, is provided. The spoiler 300 which is rotatably linked to the main wing 200 by a hinge 301 comprises a lower surface 314 facing the pressure side 202 of the main wing 200 and an upper surface 313 facing the suction side 201 of the main wing 200 and being oriented in opposition to the lower surface 314 of the spoiler 300, is provided.

Within the fairing 118 at least a part of the flow control device 10 is disposed: Here the inlet duct 20 of the flow control device 10 runs within the fairing 118. After a bend upwards the inlet duct 20 leaves the fairing 118 and extends as far as the trailing edge flap 400. A Y-bifurcation is provided within the contour of the trailing edge flap 400, which connects the inlet duct 20 with a distribution duct 40. Connecting onto the distribution duct 40 is the outlet duct 30.

According to an embodiment of the invention, the flow control device 10 which is provided for purposes of influencing the flow around the main wing 200 and the at least one spoiler 300 and/or the at least one flap 400 of one wing comprises at least one inlet duct 20 running along the main wing chordwise direction H-KT and comprises at least one inlet 22. The inlet duct according to FIG. 1 extends sectionally through the fairing 118 and outside the fairing between the fairing and the flap 400. Within the flap, the inlet duct leads to a distribution duct 440 and thereafter to an outlet duct.

The flow control device 10 is arranged at least partially within the fairing 118, and the inlet 22 of the at least one inlet duct 20 is facing in opposition to the main wing chordwise direction H-KT of the main wing 200. Further, at least one inlet 22 per inlet duct 20 is arranged in a range starting from the front of the fairing 118 with respect to the main wing chordwise direction H-KT and extending to over one third in the direction of the main wing chordwise direction H-KT.

Both the inlet duct 20 and also the outlet duct 30 have an opening, namely the inlet 22 and the outlet 32. Here the outlet 32 is arranged on the upper surface of the trailing edge flap 400, such that by means of the flow control device 10 flowing air can be delivered onto the upper surface of the trailing edge flap 400. At this point on the trailing edge flap 400 the flow on the upper surface of the high lift system 100 has a tendency to separate. As a result of the additional assistance given to the flow by the flow control device 10 via the outlet 32, the separation of the flow on the trailing edge flap 400 can be avoided, or at least delayed, or even a reattachment of the flow can be brought about in this region.

In FIG. 1 the inlet 22 of the inlet duct 20 of the flow control device 10 is provided on the side of the fairing 118 facing towards the flow direction. While the inlet duct is in fact inclined to the direction of flow, it has an effective cross-section against the direction of flow and at the same time is inclined towards the chordwise direction of the main wing. This signifies that the inlet 22 faces against the direction of flow and is thus able to collect air from the flow on the underside 204 of the high lift system 100 and guide it into the inlet duct 20.

Here both the inlet 22 and also the outlet 432 are provided with shut-off devices 24 and 434. The inlet shut-off device 24 and also the outlet shut-off device 434 are in this example of embodiment embodied as mechanical flaps, which can open and close the inlet 22 and/or outlet 432. Here in this example of embodiment in accordance with FIG. 1 the opening directions of the respective shut-off devices 24 and 434 are aligned with the direction of flow. This means that an overpressure arising at the overpressure side of the shut-off devices 24 and 434, namely on the outer surface of the fairing 118 and on the inner surface of the outlet shut-off device 434, causes the respective shut-off devices 24 and 434 to open. Here, however, both shut-off devices 24 and 434 can be actively activated so as to maintain the respective shut-off devices 24 and 434 in a closed or an open state independently of the flow conditions around the respective shut-off device.

The use of mechanical opening flaps as in FIG. 1 for the shut-off devices 24 and 34, has the further advantage that quantitative inlet control can be achieved in this manner. Thus via the defined opening setting of the inlet shut-off device 24, the effective flow cross-section of the inlet 22 can be increased, or reduced, and thus the volumetric flow of air admitted can be controlled.

Furthermore in the example of embodiment in FIG. 1 a pump 470 sits in the inlet duct 20; even under low-speed flight conditions this can provide the overpressure in the flow control device 10 necessary for control of the flow. Under a low speed flight condition the pump 470 is able to generate on its suction side a reduced pressure that sucks a quantity of air into the inlet duct 20 greater than that which would flow in through the inlet 22 as a result of just the flight speed. On the pressure side of the pump 70 this increased quantity of air is pushed in the direction of the distribution duct 40 and outlet duct 430.

In the inlet duct 20 a bifurcation is furthermore provided, where one bifurcation arm discharges into the distribution duct 440 as a free-flow bifurcation arm, and a second bifurcation arm serves as a seating for a flow variator 50 and then likewise discharges into the distribution duct 440. Needless to say, an arrangement of the flow variator 50 and the bifurcation after the distribution duct 440 is also conceivable within the framework of the present invention. A defined quantity of air, i.e. defined by the flow cross-section of the free-flow bifurcation arm, can flow continuously through the free-flow bifurcation arm into the distribution duct, and via the outlet duct 430 and the outlet 32 onto the upper surface of the trailing edge flap 400. Onto this basic flow is superimposed an additional quantity of air which in a pulsating manner is allowed by the flow variator 450 into the distribution duct 440 and the outlet duct 430, such that a pulsating flow exits from the outlet 432, varying between a minimum and a maximum flow of air.

Figure 2:
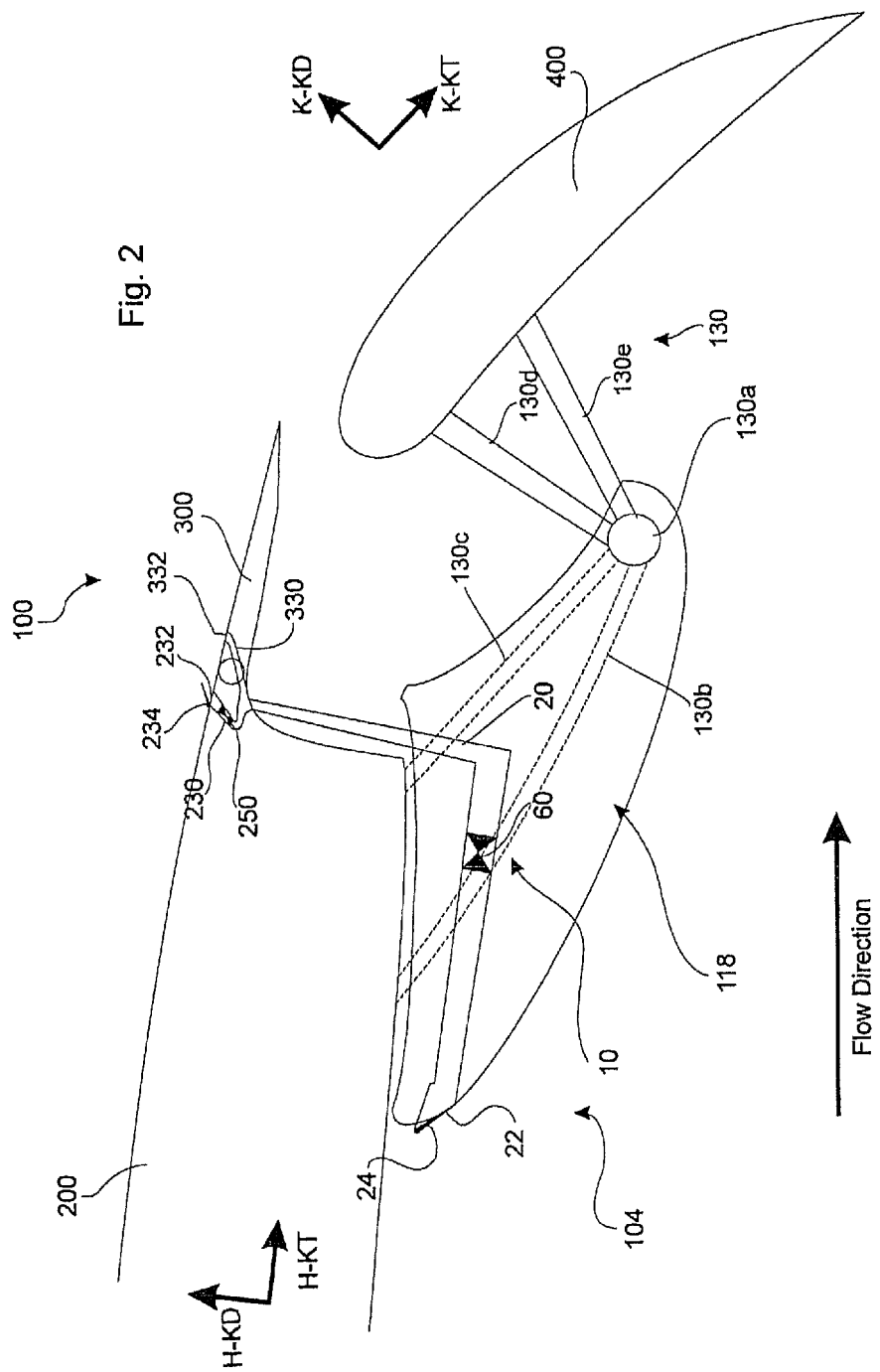
FIG. 2 shows a second example of embodiment of the present invention.

FIG. 2 shows a further example of embodiment of a high lift system 100. In contrast to the example of embodiment shown in FIG. 1, here in FIG. 2 the flow control device 10 is provided not for the trailing edge flap 400, but rather for the regulating flap 300, 400 on the main wing 200, i.e. the spoiler 200. Here the inlet duct 20 of the flow control device 10 is once again arranged within the fairing 118 and exits from the latter upwards in the direction of the main wing 200 in its region in the vicinity of the spoiler 200. There it enters into the fairing of the main wing 200 and the spoiler 200 and discharges into the outlet duct 230 of the main wing 200. Alternatively or in addition, a outlet duct 3320 with an outlet 332 can be provided on the spoiler 300. In the outlet duct 230 and/or 330 is arranged a flow variator 250, which releases a pulsating flow of air into the outlet duct 230, and thus enables a pulsating control via the outlet 232 of the flow on the spoiler 200.

Both the inlet 222 and also the outlet 232 of the flow control device 10 are once again provided with shut-off devices 24 and 234. These can alternatively or in addition be integrated in the duct 330. The inlet shut-off device 24 in FIG. 2 is now represented in the closed state. In this state the flow control device is therefore inactive in fluid mechanics terms, in other words, it is non-operational. In fact the flow on the lower surface 204 of the high lift system 100 is not controlled and flows past the fairing 118.

In the interior of the inlet duct 20, a control valve 60 is provided to restrict the airflow in the flow control device. Thus, with a fully open inlet shut-off device 24, the quantity of air within the inlet duct 22 can be further varied. In the event that, for example, under cruise flight conditions, or during rapid flight maneuvers, a large quantity of air enters into the inlet duct 20 via the inlet 22 that is too large, however, for the desired control of the regulating system, this can be restricted via the control valve 60. Thus only a defined quantity of air passes through the further course of the inlet duct 20 to enter the flow variator 50, which can perform its flow control variation task and generates a defined and pulsating flow via the outlet 32 onto the upper surface of the spoiler 200.

Figure 3:
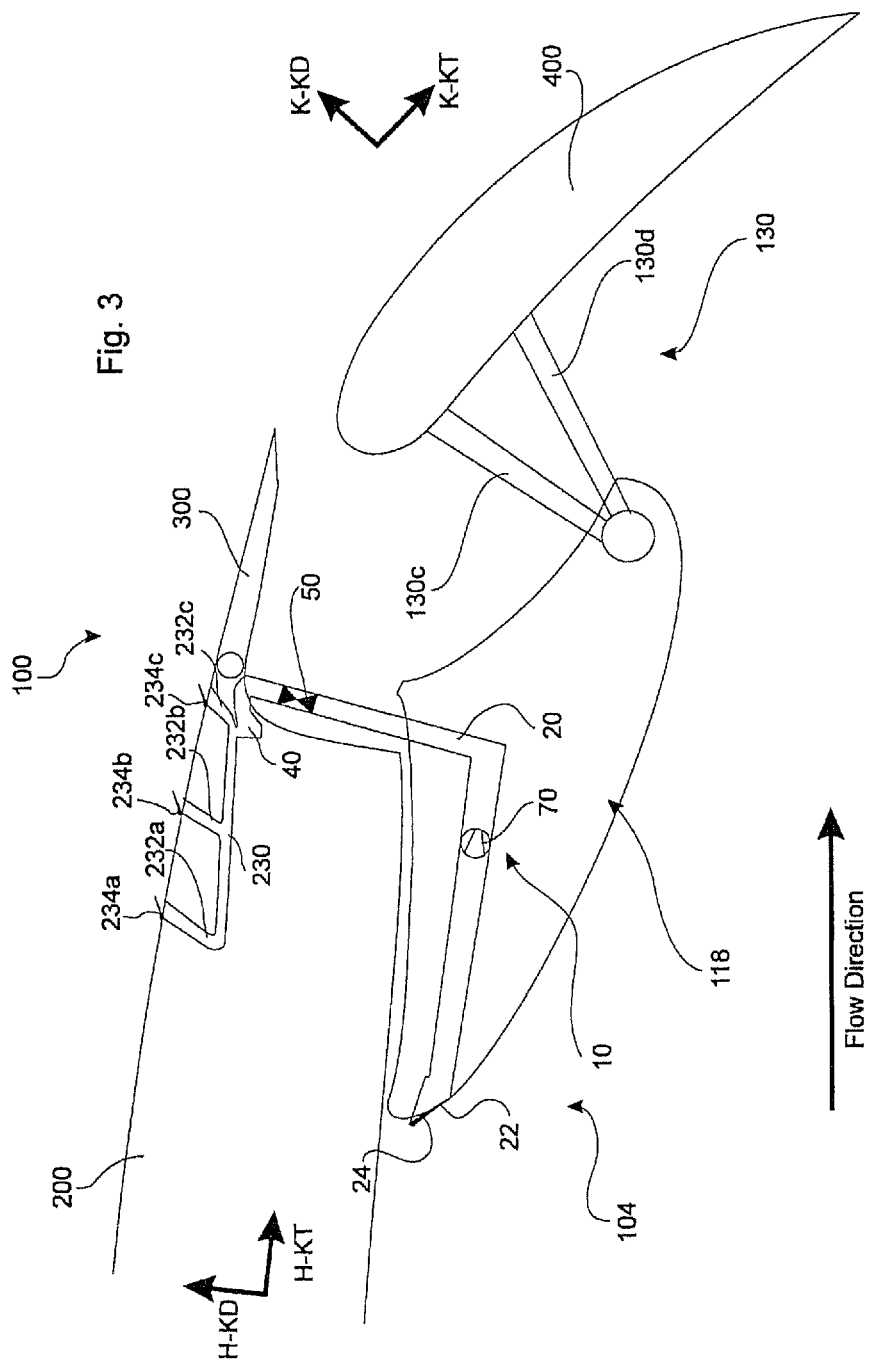
FIG. 3 shows a third example of embodiment of the present invention.

FIG. 3 is a variation of the example of embodiment in accordance with FIG. 2. Thus, in this example of embodiment the outlets 32 are provided not only on the spoiler 200, but also on the main wing 200. Here two outlets 32 or 232a, 232b, 232c are provided on the upper surface of the main wing 200 and one 232c on the upper surface of the spoiler 200. The two outlets 232b, 232c on the upper surface of the main wing 200 therefore lie in the region of the spoiler 200, as a regulating flap. In this manner an even more effective control of the flow is possible with a flow control device 10. The flow on the upper surface 102 of the high lift system 100 is thus controlled at a plurality of locations and can thus already be fully controlled in the region of the spoiler 200, and can thus fully deploy the effect to be achieved by the control. A flow that has already separated upstream of the spoiler 200 can in this manner be at least partially reattached, and thus reaches the spoiler 200 in a reattached state. In this manner the spoiler 200 can deploy its aerodynamic effect.

In the example of embodiment shown in FIG. 3 the flow variator 50 is provided in the inlet duct 20. Here the flow variator 50 is still located upstream of the distribution duct 40 and thus upstream also of the outlet ducts 30. In this manner a single flow variator 50 can be used for a multiplicity of outlet ducts 30 and outlets 232a, 232b, 232c. This has the consequence that weight can be significantly reduced. Also for a multiplicity of outlet ducts 30 and outlets 232a, 232b, 232 the costs for the flow variator 50 are incurred only once.

In addition, in the example of embodiment shown in FIG. 3 a pump 70 is once again provided in the inlet duct 20; under low-speed flight conditions this can, for example, generate an underpressure suction in the region of the inlet 22, so as to ensure, even under such flight conditions, a sufficient supply of air to the flow on the upper surface 102 of the high lift system 100.

Figure 4:
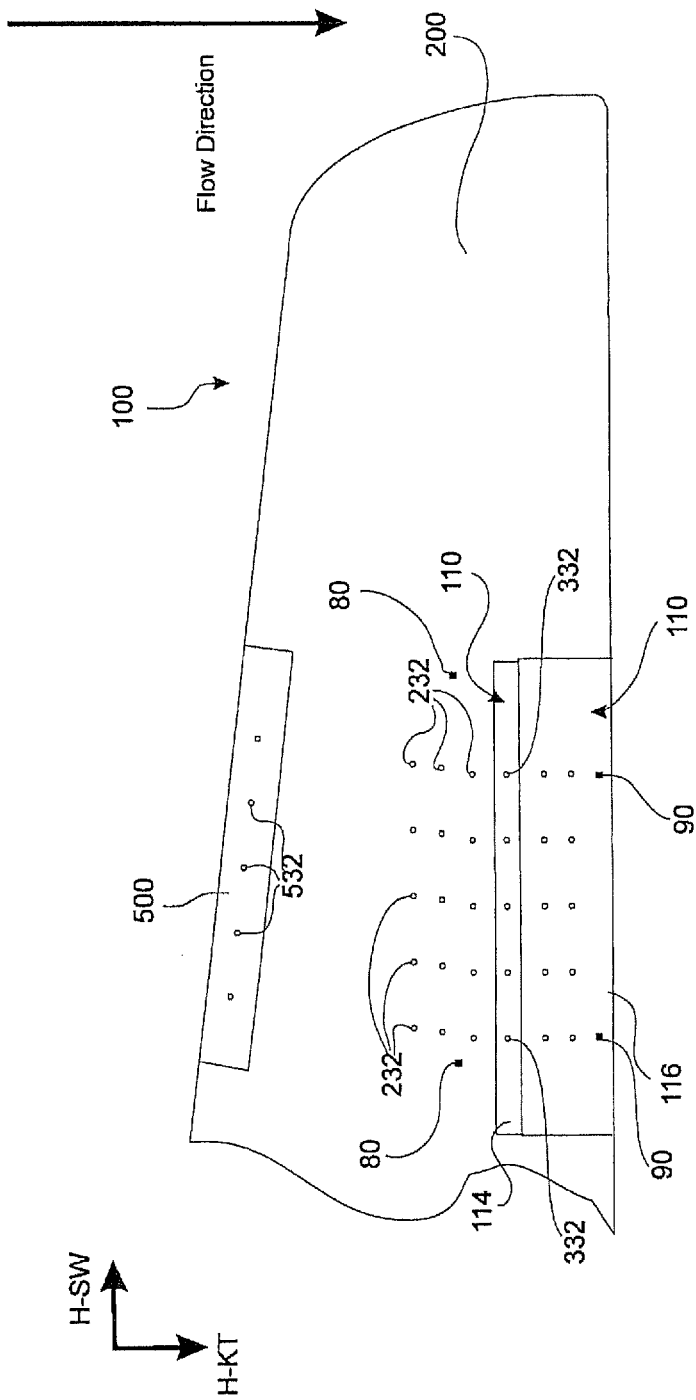
FIG. 4 shows a plan view onto a high lift system in accordance with the invention.

FIG. 4 shows a plan view onto a high lift system 100. On this plan view are shown a multiplicity of possible arrangements of outlets 32 or 232, 332, 532. Here outlets 32 are provided on all control flaps 300, 400, as also on the main wing 200 itself. On the leading edge of the main wing 200 a leading edge flap 500 is provided with outlets 332 of a flow control device 10. On the trailing edge of the main wing 200 a trailing edge flap 400 is provided, which likewise has outlets 32 for control of the flow on the upper surface 102 of the high lift system 100. Outlets 332 are likewise provided on a spoiler 300. Outlets 232 are also provided on the main wing 200 itself in the region upstream of the spoiler, here more than three times the projection of the spoiler 300 in the main wing chordwise direction. These already control the flow on the upper surface 102, before the flow reaches the spoiler 300 and the trailing edge flap 400. Thus it is possible for the flow to have already been subject to control measures on arrival at the respective regulating flap 300, 400, such that avoidance, or delay, of separation of the flow, or even its reattachment, can be achieved even more efficiently. Here in an example of embodiment shown in FIG. 4 separate flow control devices 10 can be provided for each regulating flap 300, 400, and common flow control devices 10 can also be provided for two or a plurality of control flaps 300, 400.

Figure 5:
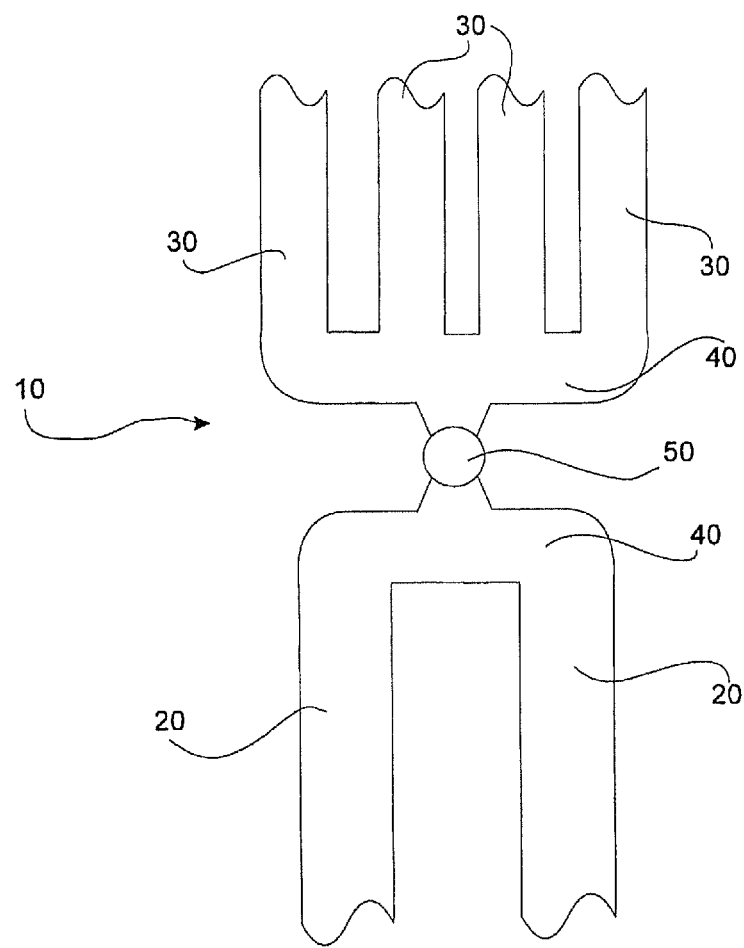
FIG. 5 shows a schematic representation of a flow control device.

FIG. 5 shows an example of embodiment for a flow control device, in which a significantly more efficient form of design has been selected. Thus two symmetrical inlet ducts 20 are provided, which discharge together into a first distribution duct 40. As seen in terms of the direction of flow a central flow variator 50 is located in the connecting region; this can vary the flow out of the inlet ducts 20, in particular in a pulsating manner. In the connecting region a further distribution duct 40 is provided, via which the varied, in particular, pulsating flow is distributed across three, or even more, outlet ducts 30. This example of embodiment has a multiplicity of advantages. Thus via the symmetrical arrangement with a large cross-section of two inlet ducts 20 a defined quantity of air can be introduced into the system. Furthermore, with the provision of a first and second distribution duct 40 a single flow variator 50 is sufficient. This saves not only with regard to the total weight of the system, but also, moreover, with regard to the complexity. Thus here there is only a single flow variator 50 to activate and regulate. In this example of embodiment shown in FIG. 5 a total of four outlet ducts 30 can be served via the second distribution duct 40, but in other examples of embodiment, such as for example in FIG. 4, significantly more, i.e. a multiplicity of outlet ducts 30 can be served, such that the multiplicity of outlets 32 represented in FIG. 4 can be served with a relatively small number of inlet ducts 20. In summary, with a high lift system 100 in accordance with the invention the inlets 22 with the corresponding inlet ducts 20 can be designed in accordance with the aerodynamic requirements and the required quantity of air, while the outlet ducts 30 and the corresponding outlets 32 can be distributed as a function of the flow separation conditions on the upper surface 102 of the high lift system 100. Complex, heavy and expensive elements, such as for example the flow variator 50, pumps 70, or control valves 60, can be reduced to a minimum by the deployment of distribution ducts 40 and by multiple usage.

Figure 6:
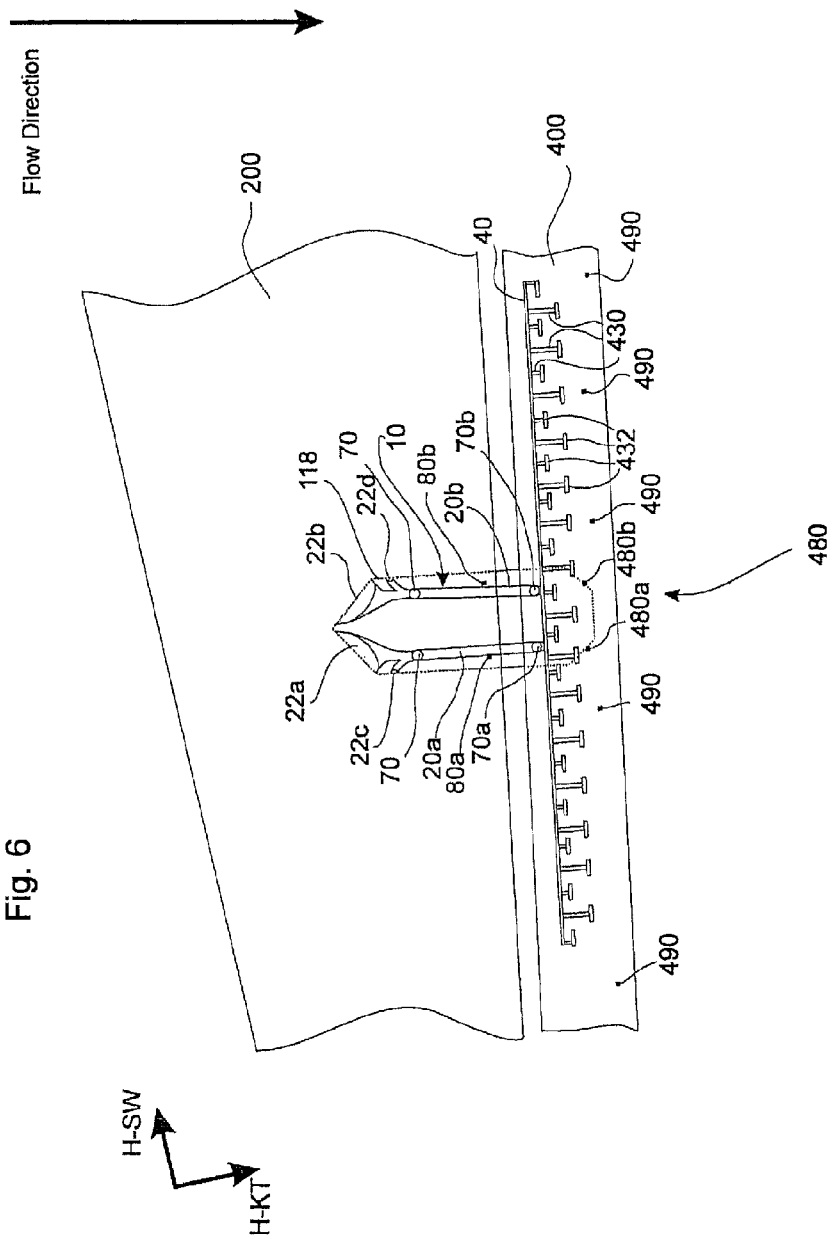
FIG. 6 shows a schematic representation of an example of embodiment of the present invention.

In FIG. 6 a further example of embodiment of the present invention is represented, in which the arrangement of the inlets 22 or 22a, 22b can be seen particularly well. This represents the plan view onto the main wing 200 and the regulating flap 300, 400, wherein the main wing 200 and the regulating flap 300, 400 are represented in a semi-transparent manner. In this manner it can be discerned that within the fairing 118 two inlet ducts 20 or 20a, 20b are arranged symmetrically with respect to the main wing chordwise direction H-KT. In the front region of the fairing 118 with respect to the main wing chordwise direction H-KT two inlets 22 are provided in each case per inlet duct 20. Here in each case one inlet 22 is relatively large and arranged at the tip of the fairing 118, while in each case a further, somewhat smaller inlet 22, is arranged downstream on the two sides of the fairing 118.

Two pumps 70 or 70a, 70 bare arranged one behind another in each of the two inlet ducts 20 or 20a, 20b to control the flow, and in low speed flight, for example, to increase the volumetric flow of air within the flow control device 10.

The outlets 432 are arranged on the regulating flap 400, and are connected in a fluid-communicating manner with the inlet ducts 20 or 20a, 20b via outlet ducts 430 and a distribution duct 440. Here the outlets 432 on the regulating flap 300, 400 are aligned along two straight lines in the direction of the main wing spanwise direction H-SW; in the main wing chordwise direction H-KT they are arranged displaced relative to one another. This results in a near-continuous control of the flow over the whole regulating flap 300, 400 in the main wing spanwise direction H-SW.

Furthermore load sensors 480 and flow sensors 490 can be discerned in FIG. 6; these are arranged both on the regulating flap 300, 400 downstream of the outlets 432 with respect to the main wing chordwise direction H-KT, and also on the main wing in its rear region, also with respect to the main wing chordwise direction H-KT. By means of these sensors 480 and 490 the actual flow conditions with respect to the relevant pressures and flows around the wing and flap surfaces can be recorded and used for purposes of regulating the flow control device 10.

Figure 7:
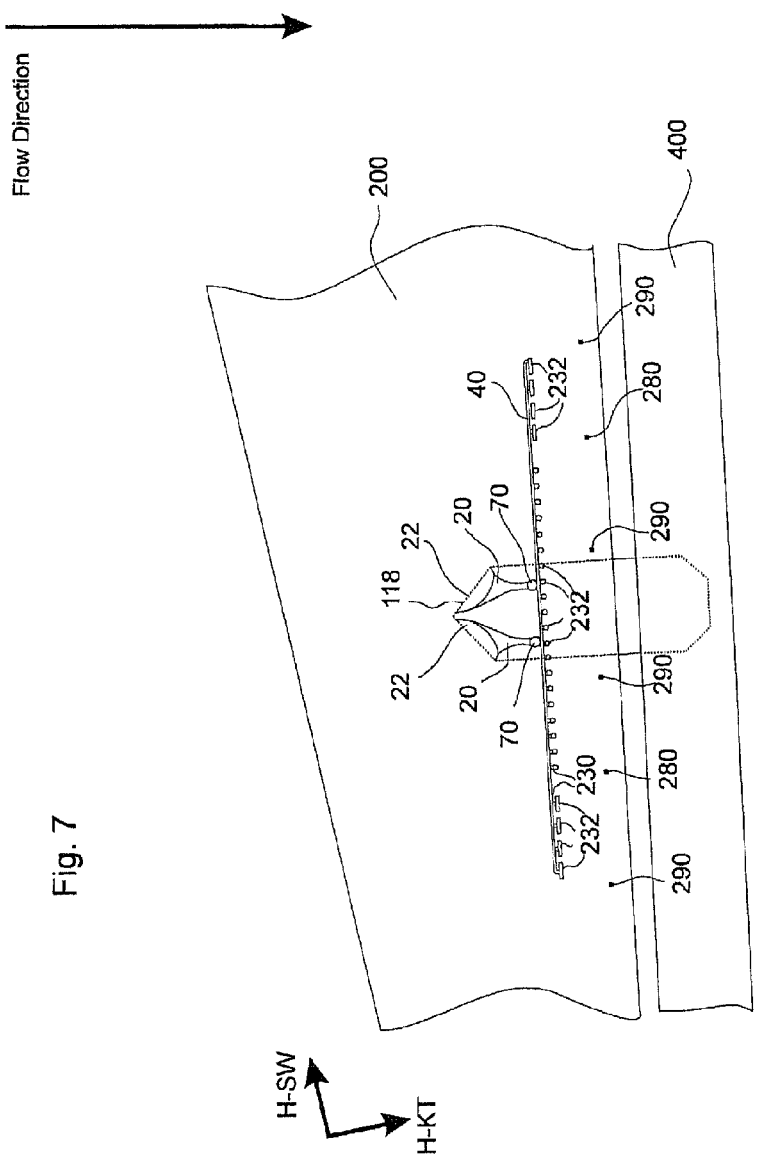
FIG. 7 shows a schematic representation of an example of embodiment of the present invention.

FIG. 7 represents an example of embodiment that is an alternative to that shown in FIG. 6. Here the outlets 232 are located on the upper surface of the main wing 200 and are already initiating control of the flow before the latter has reached the regulating flap 300, 400. Here the outlets 232 are of different shapes; in the two edge regions of the outlet arrangement rectangular outlets 232 are provided, which have a relatively large flow cross-section, while the other outlets 232 in between them have an essentially circular shape and at the same time a relatively small flow cross-section. Also just a single inlet 222 is provided for each of the two inlet ducts 20. The two inlets 22 are provided essentially symmetrically relative to one another with respect to the main wing chordwise direction H-KT at the front end of the fairing 118. Since, by virtue of the arrangement of the outlets 32 on the upper surface of the main wing 200, a relatively short path prevails between inlets 22 and outlets 232, only one pump is also provided in each of the two inlet ducts 20. The individual elements of the forms of embodiment as per FIG. 6 and FIG. 7 can, of course, also be combined with one another in any manner. Thus, for example, an arrangement of the outlets 432 as per FIG. 6 is also possible in the form of embodiment of FIG. 7.

REFERENCE SYMBOL LIST

10 Flow control device
20 Inlet duct
22 Inlet
24 Inlet shut-off device
30 Outlet duct
32 Outlet
34 Outlet shut-off device
40 Distribution duct
50 Flow variator
60 Control valve
70 Pump
80 Load sensor
90 Flow sensor
100 High lift system
102 Upper surface of the high lift system
204 Lower surface of the high lift system
300, 400 Regulating flap of the high lift system
200 Main wing
200 Spoiler
400 Trailing edge flap
117 Leading edge flap
118 Fairing
130 Guiding device
130 Support device
H-KT Main wing chordwise direction
H-KD Main wing thickness direction
H-SW Main wing spanwise direction
K-KT Regulating flap chordwise direction
K-KT Regulating flap thickness direction

The invention claimed is:

1. A high lift system comprising a main wing, control flaps, and guiding devices for the positioning of the control flaps, wherein the guiding devices are at least partially provided with a fairing, the high lift system further comprising:
    a flow control device for purposes of influencing the flow around the main wing and the control flaps, with at least one inlet duct running along the main wing chordwise direction each with at least one inlet, which is located on or underneath a lower surface of the main wing, and at least one outlet duct, which is connected with the at least one inlet duct in a fluid-communicating manner, and has at least one outlet so that fluid which is streaming into the inlet duct can be discharged through the outlet, wherein the outlet is located on at least one of an upper surface of the at least one control flap and on an upper side of the main wing, on the main wing in the rear third of the length of the main wing with respect to the main wing chordwise direction;
    wherein the flow control device is arranged at least partially within the fairing, and the inlet of the at least one inlet duct is facing in opposition to the main wing chordwise direction; and
    wherein at least one inlet per inlet duct is arranged in a range starting from the front of the fairing with respect to the main wing chordwise direction and extending to over one third in the direction of the main wing chordwise direction.

2. The high lift system in accordance with claim 1, wherein the fairing comprises at least two inlet ducts, each comprising at least one inlet, wherein two inlets of the inlets are respectively disposed on flow surfaces, the flow surfaces extending in directions diverging from each other.

3. The high lift system in accordance with claim 1, wherein at least one outlet duct is provided per inlet duct, which is connected with the respective inlet duct in a fluid-communicating manner, and the outlet ducts run along the main wing chordwise direction.

4. The high lift system in accordance with claim 1, wherein the inlets are respectively designed as openings directly in the fairing.

5. The high lift system in accordance with claim 1, wherein at least one of inlet shut-off devices is provided for the inlets and an outlet shut-off device is provided for at least one outlet.

6. The high lift system in accordance with claim 5, wherein at least one control flap comprises at least one outlet which is located on the upper surface of the respective control flap, wherein at the at least one outlet an inlet shut-off device is disposed, and the at least one outlet shut-off device is coupled, either one or both of, kinematically and functionally with the position of the control flap, such that the status of the respective shut-off device is determined by the setting of the control flap.

7. The high lift system in accordance with claim 5, wherein at least one control flap comprises at least one outlet which is located on the upper surface of the respective control flap, wherein at the at least one outlet an inlet shut-off device is disposed, and the at least one inlet shut-off device is coupled, either one or both of, kinematically and functionally with the position of the control flap, such that the status of the respective shut-off device is determined by the setting of the control flap.

8. The high lift system in accordance with claim 6, wherein the degree of opening of the respective shut-off device is a function of the setting of the control flap such that a predetermined opening state of the respective shut-off device is assigned to each of several settings.

9. The high lift system in accordance with claim 1, wherein in, at least one of, each inlet duct and each outlet duct at least one control valve or at least one pump is provided to control the volumetric flow within the flow control device.

10. The high lift system in accordance with claim 1, wherein in each inlet duct at least one flow variator for the systematic variation of the flow of air through the inlet duct is provided so that the discharge flow of the fluid being discharged through the respective outlet can be varied.

11. The high lift system in accordance with claim 10, wherein the flow variators are embodied as passively operating valves, or as a pump.

12. The high lift system in accordance with claim 1, wherein an activation device is provided for the receipt of flight state data and generation of control signals, such that the flow control device can be activated and deactivated under particular flight conditions.

13. The high lift system in accordance with claim 10, wherein the activation device is functionally coupled to at least one of the at least one shut-off device and the at least one flow variator for controlling the respective one in dependency of the position of the control flap on which the respective shut-off device is positioned.

14. The high lift system in accordance with claim 12, wherein the activation and deactivation takes place by switching of at least one of an inlet shut-off device and an outlet shut-off device.

15. The high lift system in accordance with claim 1, wherein a distribution duct is provided between the at least one inlet duct and the at least one outlet duct.

16. The high lift system in accordance with claim 1, wherein the at least one the inlet duct is configurable to be in fluid-communicating contact with further systems of an aircraft, the further systems of the aircraft being selected from the group consisting of air conditioning systems, hydraulic systems, and pneumatic systems of the aircraft.

17. The high lift system in accordance with claim 1, wherein the ducts are modifiable at least partially in their axial projection.

18. The high lift system in accordance with claim 1, wherein the at least one outlet is arranged along the main wing spanwise direction.

19. The high lift system in accordance with claim 1, wherein the at least one outlet is arranged along at least two lines in the main wing spanwise direction, and the at least one outlet of one line is arranged displaced relative to each of the at least one outlet of the adjacent line in the main wing spanwise direction.

20. The high lift system in accordance with claim 1, wherein at least one of load sensors and flow sensors are provided behind the in the main wing chordwise direction.

21. The high lift system in accordance with claim 20, wherein the load sensors and the flow sensors are arranged alternately in the main wing spanwise direction.

22. An aircraft having at least one high lift system of claim 1.

* * * * *